United States Patent
Aswani et al.

(10) Patent No.: US 9,889,759 B1
(45) Date of Patent: Feb. 13, 2018

(54) MARKET-ADAPTIVE DETECTION OF PLUG-IN ELECTRIC VEHICLE CHARGING USING WHOLE HOUSE ENERGY METERING DATA

(71) Applicant: Sacramento Municipal Utility District, Sacramento, CA (US)

(72) Inventors: Deepak Jayanti Aswani, Sacramento, CA (US); Nathan Toyama, Sacramento, CA (US); William David Boyce, Gold River, CA (US)

(73) Assignee: Sacramento Municipal Utility District, Sacramento, CA (US)

( * ) Notice: Subject to any disclaimer, the term of this patent is extended or adjusted under 35 U.S.C. 154(b) by 582 days.

(21) Appl. No.: 14/530,352

(22) Filed: Oct. 31, 2014

Related U.S. Application Data

(60) Provisional application No. 61/992,098, filed on May 12, 2014.

(51) Int. Cl.
  *B60L 11/18* (2006.01)
  *G01R 21/133* (2006.01)
  *G06Q 20/14* (2012.01)

(52) U.S. Cl.
  CPC ......... *B60L 11/184* (2013.01); *B60L 11/1848* (2013.01); *G01R 21/133* (2013.01); *G06Q 20/145* (2013.01)

(58) Field of Classification Search
  None
  See application file for complete search history.

(56) References Cited

U.S. PATENT DOCUMENTS

| | | | |
|---|---|---|---|
| 4,858,141 A | 8/1989 | Hart et al. | |
| 9,156,368 B2 * | 10/2015 | Chen | B60L 11/1848 |
| 2012/0123709 A1 | 5/2012 | Chen et al. | |
| 2013/0289788 A1 | 10/2013 | Gupta et al. | |
| 2016/0055419 A1 * | 2/2016 | Fischer | G06N 5/048 |
| | | | 706/12 |

OTHER PUBLICATIONS

"Computing Electricity Consumption Profiles from Household Smart Meter Data" Omid Ardakanian, 2014, available at http://blizzard.cs.uwaterloo.ca/~rmmatharu/pdf/endm2014.pdf.*
George Hart, Nonintrusive Appliance Load Monitoring, Proceedings of the IEEE, vol. 80, No. 2, Dec. 1992.
Lena Kallin Westin, Receiver operating characteristic (ROC) analysis, Dept. of Computer Science, Umea University—Umea, Sweden, 2004.
Tom Fawcett, An Introduction to ROC Analysis, Institute for the Study of Learning and Expertise, Palo Alto, California, Dec. 19, 2005.
Peng Zhang, et al., An Improved Non-Intrusive Load Monitoring Method Recognition of EV Battery Charging Load, ScienceDirect.com, Sep. 2011.

(Continued)

*Primary Examiner* — Allen C Chein
(74) *Attorney, Agent, or Firm* — Matthew J. Spark; Stefan J. Kirchanski; Zuber Lawler & Del Duca LLP

(57) ABSTRACT

The invention provides improved methods for detecting the presence of a plug-in electric vehicle (PEV) at a location based on interval measurements from whole house electrical meters. This methodology is applicable to multiple detection algorithms and has been validated using actual PEV customer data.

31 Claims, 13 Drawing Sheets

(56) References Cited

OTHER PUBLICATIONS

Shiyin Zhong, et al., A Frequency Domain Approach to Characterize and Analyze Load Profiles, IEEE Transactions on Power Systems, vol. 27, No. 2, May 2012.
Markus Weiss, et al., Leveraging smart meter data recognize home appliances, 2012.
Daisuke Mashima, et al., Evaluating Electricity Theft Detectors in Smart Grid Networks, 2012.
Liang Du, et al., Support Vector Machine Based Methods for Non-Intrusive Identification of Miscellaneous Electric Loads, 2012.
Electric Power Research Institutute, Automated discovery of Plug-in Electric Vehicle Charging Using AMI Meter Data, Electric Power Research Institute, 2013.
Christing Lee, et al., Automated discovery of Pev Charging Using Meter Data: Algorithm Development, Electric Power Research Institute, Sep. 10, 2013.
K. Carrie Armel; Is Disaggregation the Holy Grail of Energy Efficiency? The Case of Electricity; Technical Paper Series PTP-2012-05-1.

* cited by examiner

MARKET-ADAPTIVE DETECTION OF PLUG-IN ELECTRIC VEHICLE CHARGING USING WHOLE HOUSE ENERGY METERING DATA

CROSS-REFERENCE TO RELATED APPLICATIONS

This application claims the benefit of U.S. provisional application Ser. No. 61/992,098 filed May 12, 2014, which is hereby incorporated by reference in its entirety.

FIELD OF THE INVENTION

The invention relates to the field of non-invasive load monitoring and electric load disaggregation.

BACKGROUND OF THE INVENTION

Some electric utilities have taken an interest in the detection of a plug-in electric vehicle's (PEV's) load using whole house meter interval data. For example, San Diego Gas & Electric has developed a patented heuristic algorithm to detect the presence of a PEV load that relies on four parameters to identify charging events: 1) a threshold level of total kWh consumption; 2) a defined duration at which kWh consumption remains above this threshold; 3) a leading edge increase in kWh consumption; and 4) a lagging edge decrease in kWh consumption. (Chen, et al., 2012)

The work of (Zhang, et al., 2011) directly applies a non-invasive load monitoring (NILM) technique to detect the presence of a charging PEV. This detection method employs pattern recognition by applying a normalized cross correlation of a specific load signature for a PEV and the whole house meter load. The charging load ramp up and ramp down unfortunately vary based on starting and ending battery state of charge, temperature, and vehicle manufacturer. Therefore, multiple signature patterns have to be tested for pattern recognition. Since the duration of load ramp up and ramp down are typically in the order of seconds to minutes, a high sampling rate is required to capture these features. In this example, the energy consumption is sampled every second (1 Hz).

Unfortunately for some smart meters deployed in residential installations, the energy consumption is sampled every hour (2.8E-4 Hz), and therefore load ramp up and ramp down features cannot be captured. As a result the detection methodology of (Zhang, et al., 2011) cannot be applied to these installations.

Several other attempts of load disaggregation and detection also require high sampling rates, prohibited by many production scale smart metering systems either through hardware or network bandwidth limitations. In (Weiss, Helfenstein, Mattern, & Thorsten, 2012), energy consumption is sampled every second (1 Hz) and both apparent and real power are measured. Apparent and real power are then run through a six step process that involves normalization, edge detection, power level computation, delta level computation, recognition, and labeling. In the implementation by (Du, et al., 2012), a high sampling rate of 30.72 kHz is used to measure energy consumption. This high sampling rate allows for conversion of the load into the spectral domain to capture detailed harmonic characteristics. A Support Vector Machine (SVM) from machine learning is then applied to detect the presence of different appliance loads. Unfortunately, SMUD's current AMI only measures real power and in hourly intervals, thereby inhibiting use of the algorithms proposed in (Weiss, Helfenstein, Mattern, & Thorsten, 2012) and (Du, et al., 2012).

Improvements are needed to existing methods for detecting the presence of plug-in electric vehicles based on low-frequency, such as hourly, whole house electric load metering data. The present invention provides a new and improved method to provide temporal segmentation/adaptation of the detection process by considering group or sub-group trends in whole house electric load metering data to enhance detection performance using existing detection methods.

SUMMARY OF THE INVENTION

One embodiment of the invention provides a computer-implemented method for detecting plug-in electrical vehicle (PEV) charging at a whole house electrical meter location that includes the steps of:

retrieving input data from a tangible computer memory, said input data including (i) whole house meter interval (such as hourly) data for a single whole house meter location to be tested and (ii) whole house meter interval (such as hourly) data for a superset of whole house meter locations (such as all residential meters or all residential meters of a certain customer segment having perhaps gas appliances, electric appliances, certain floor space in square feet, etc.);

calculating time-referenced summary statistics including one or both of the means and standard deviations for the whole house meter interval data for the superset;

selecting a time period, such as a 24-hour period, for testing a location for PEV charging;

generating a SINGLE HOME MATRIX which is a matrix of whole house meter interval data to be tested;

generating one or both of:
    a MEAN MATRIX which is a matrix of corresponding interval means from the superset, and
    a STANDARD DEVIATION MATRIX which is a matrix of corresponding interval standard deviations from the superset;

normalizing the SINGLE HOME MATRIX using one or both of the MEAN MATRIX and the STANDARD DEVIATION MATRIX to generate a NORMALIZED MATRIX;

applying a binary hypothesis test to the NORMALIZED MATRIX to obtain a determination of whether PEV charging is present at the single whole house meter location; and storing a record of the determination in tangible computer memory.

The step of normalizing the SINGLE HOME MATRIX to generate a NORMALIZED MATRIX may include:

element-wise subtraction of the MEAN MATRIX from the SINGLE HOME MATRIX to obtain element-wise differences; and/or element-wise division of the element-wise differences by the STANDARD DEVIATION MATRIX to obtain element-wise results that are assigned to the NORMALIZED MATRIX.

Another embodiment of the invention provides a computer-implemented method for detecting plug-in electrical vehicle (PEV) charging at a whole house electrical meter location using a Support Vector Machine (SVM) algorithm that includes the steps of:

retrieving input data from a tangible computer memory, said input data including (i) whole house meter interval (such as hourly) data for a single whole house meter location to be tested and (ii) whole house meter interval (such as hourly) data for a superset of whole house meter locations (such as all residential meters or all residential meters of a certain customer segment having perhaps gas appliances, electric appliances, certain floor space in square feet, etc.);

calculating time-referenced summary statistics including the means for the whole house meter interval data for the superset;

selecting a time period, such as a 24-hour time period, for testing a location for PEV charging;

generating a SINGLE HOME MATRIX which is a matrix of whole house meter interval data to be tested (x);

generating a TEMPORAL SEGMENTATION MATRIX which is a matrix of corresponding interval means from the superset (μ);

selecting a NOMINAL DAY MODEL MATRIX of whole house meter interval data from a set of matrices that are representative of no PEV charging for a similar corresponding time interval based on what matrix has the smallest norm (i.e. Euclidean/L2 norm) of difference with respect to the TEMPORAL SEGMENTATION MATRIX (so NOMINAL DAY MODEL MATRIX≈μ=TEMPORAL SEGMENTATION MATRIX, but for an infinite set of matrices, NOMINAL DAY MODEL MATRIX=μ=TEMPORAL SEGMENTATION MATRIX) This includes the substeps of:
  a) Compute the pairwise difference matrices of TEMPORAL SEGMENTATION MATRIX and each matrix of the set of matrices representative of no PEV charging;
  b) Find the pairwise difference matrix that has the smallest norm
  c) Assign the associated matrix from step (b) from the set of matrices representative of no PEV charging to NOMINAL DAY MODEL MATRIX (this matrix from the set of matrices is most representative of TEMPORAL SEGMENTATION MATRIX)

generating a PEV DAY MODEL MATRIX of whole house meter interval data that is the element-wise sum of the NOMINAL DAY MODEL MATRIX plus a predetermined sequence of PEV charging load that is typical for the time period selected ($\mu+X_1$). Predetermined PEV charging load profiles may be readily identified through profiles available in research publications or conducting a sample study using load recorders on the vehicle or chargers;

calculating the norm for the difference of SINGLE HOME MATRIX minus NOMINAL DAY MODEL MATRIX (i.e. euclidian/L2 norm) and then taking the reciprocal, assigned to NULL ($=1/\|x-\mu\|$);

calculating the norm for the difference of SINGLE HOME MATRIX minus PEV DAY MODEL MATRIX (i.e. euclidian/L2 norm) and then taking the reciprocal, assigned to ALTERNATE($=1/\|x-(\mu+X_1)\|=1/\|x-\mu-X_1\|$);

dividing ALTERNATE by NULL to obtain a RATIO value;

making the determination that if the RATIO value is greater than a preselected calibration parameter (which may be uniquely selected based on the superset or other considerations), then a PEV is detected, else no PEV is detected for the selected single whole house meter location during the time period being tested; and storing a record of the determination in tangible computer memory.

A further embodiment of the invention provides a computer-implemented method for detecting plug-in electrical vehicle (PEV) charging at a whole house electrical meter location using a Likelihood Ration Test (LRT) algorithm that includes the steps of:

retrieving input data from a tangible computer memory, said input data including (i) whole house meter interval (such as hourly) data for a single whole house meter location to be tested and (ii) whole house meter interval (such as hourly) data for a superset of whole house meter locations (such as all residential meters or all residential meters of a certain customer segment having perhaps gas appliances, electric appliances, certain floor space in square feet, etc.);

calculating time-referenced summary statistics including the means and standard deviations for the whole house meter interval data for the superset;

selecting a time period, such as a 24-hour time period, for testing a location for PEV charging;

generating a SINGLE HOME MATRIX which is a matrix of whole house meter interval data to be tested (x);

generating one or both of:
  a MEAN MATRIX which is a matrix of corresponding interval means from the superset (μ), and
  a STANDARD DEVIATION MATRIX which is a matrix of corresponding interval standard deviations from the superset (σ);

generating a TEMPORAL SEGMENTATION MATRIX which is a concatenated matrix of MEAN MATRIX and STANDARD DEVIATION MATRIX [μ, σ];

selecting a joint probability density/mass function from a set of parameterized functions for no PEV charging (null function) based on which function's corresponding matrix of concatenated means and standard deviations has the smallest norm (i.e. Euclidean/L2 norm) of difference with respect to the TEMPORAL SEGMENTATION MATRIX (For example, one representation would be that the joint probability density/mass function would have its calculated means and/or standard deviations by interval be identical to those of the TEMPORAL SEGMENTATION MATRIX. The joint probability density mass function could be a joint normal distribution, joint normal skew distribution, weighted sum of normal distribution and exponential distribution, etc.);

generating a joint probability density/mass function for a PEV charging (alternate function) by adding a mean and standard deviation adjustment to the null function which could be as simple as a constant mean offset by charge rate R or a time-weighted offset for mean and standard deviation. Predetermined PEV charging load profiles may be identified through profiles available in research publications or conducting a sample study using load recorders on the vehicle or chargers;

constant (simple):

Alternate Hypothesis: $\Theta_{1,k}(R)=[\mu_k+R,\sigma_k,A_k]$ weighted (sophisticated—The Probability Mass Function (PMF) for PEV charge start time s is defined as $f_{s,R}(s)$ and the PMF for daily PEV energy consumption e is defined as $f_{e,R}(e)$.):

$$f_{daily}(x\mid \Theta_1(R)) \approx \sum_{(e)}\sum_{(s)} f_{daily}(x\mid \Theta_1(R), s, e) f_{s,R}(s) f_{e,R}(e)$$

calculating the null function value for the SINGLE HOME MATRIX and assign to NULL HYPOTHESIS;

calculating the alternate function value for the SINGLE HOME MATRIX and assign to ALTERNATE HYPOTHESIS;

dividing the ALTERNATE HYPOTHESIS by the NULL HYPOTHESIS to obtain a RATIO value; and making the determination that if the RATIO value is greater than a preselected calibration parameter, then a PEV is detected, else no PEV is detected for the selected whole house meter location during the time period being tested; and storing a record of the determination in tangible computer memory.

In any of the method embodiments, the superset of whole house meter locations may selected from the group consisting of the whole population of whole house meter locations or may be a subgroup of the whole population of whole house meter locations, such as a geographic subgroup, home/metering location-type subgroup or demographic subgroup. The methods may, for example, be performed for each of a plurality of single whole house meter locations to be tested in the superset. Any of the methods may further include the step of: for a whole house meter location for which a determination is made that PEV charging is present, assigning a reduced billing rate for at least some electrical power consumption at that whole house meter location or, more generally, providing an incentive to the associated consumer. The reduced billing rate may, for example, only be applied to the period in which PEV charging is detected according to the method. Any of the methods may further include the step of: early identification of electric vehicle charging locations for more detailed distribution infrastructure load analysis to assess what type of distribution infrastructure upgrade may be needed for pole mount or pad mount service transformers and associated wiring to maintain a certain reliability performance.

A related embodiment of the invention provides a computer system configured to detect PEV charging based on whole house meter data, that includes:

at least one processor;
processor-accessible memory; and
computer instructions stored in the processor-accessible memory, said computer instructions configured to direct the processor to perform the steps of any of the method embodiments of the invention and variations thereof described herein.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION

The invention provides improved methods for detecting the presence of a plug-in electric vehicle (PEV) based on interval measurements from a whole house electrical meter. A novel feature of this invention is adaption based on the reference population segment characteristics, in time synchronized fashion. This feature reduces the systematic effects resulting from time dependence, weather, and seasonal characteristics that can compromise the ability for detection. Advantageously, the methods of the invention allow meaningful determinations regarding the presence of a PEV to be made based on load metering data, such as hourly metering data.

Figure 1:
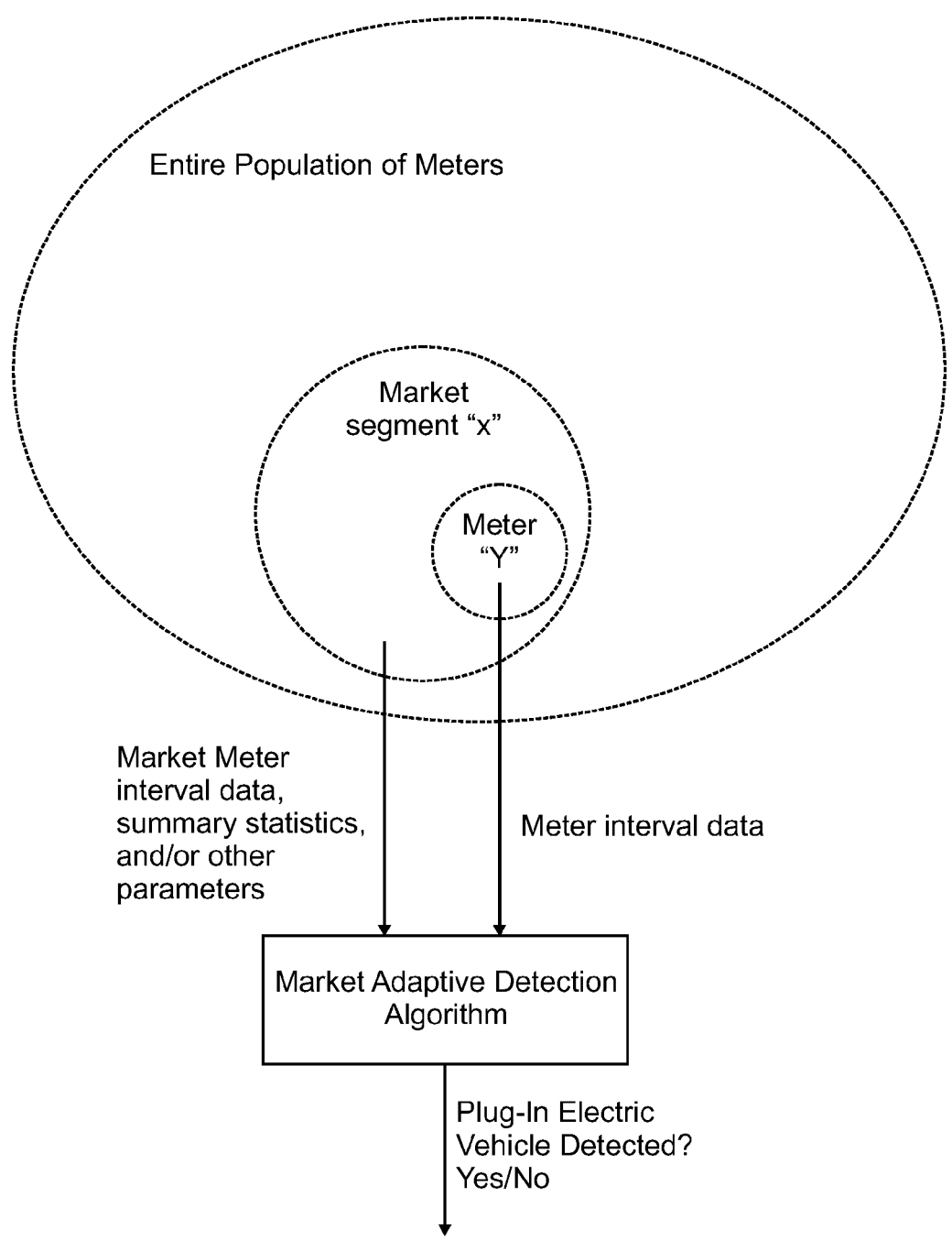
FIG. 1 is a schematic diagram illustrating the market segmentation aspect of the invention.

FIG. 1 is a schematic diagram illustrating the market segmentation aspect of the invention. The market segmentation (market adaptive) approach of the invention may be implemented effectively with various algorithms applied to PEV detection, for example:

1) An array of meter interval data normalized using market segment time-varying summary statistics for a Support Vector Machine algorithm;
2) Likelihood Ratio Test algorithm adjusted based on market segment time-varying summary statistics (for meter interval data); and
3) Likelihood Ratio Test algorithm adjusted based on market segment time-varying summary statistics (for an array of meter interval data).

The present invention uses time-varying data derived from the metering data as the basis for segmentation, which may augment static segmentation of households (meter locations) based on demographics, income or zip code (such factors may optionally also be used according to the invention). For example, market segmentation according to the invention may include segmentation by mean electrical usage over time and/or by standard deviation over time. This methodology was applied to multiple algorithms and validated using PEV customer data from the Sacramento Municipal Utility District (SMUD). Advantageously, early identification of PEVs using the methods and systems of the invention can enhance grid reliability through focused marketing of peak-load management rate plans for PEVs and pro-active load analysis for distribution infrastructure upgrades.

Fit, Training, and Validation Methodology

Figure 2:
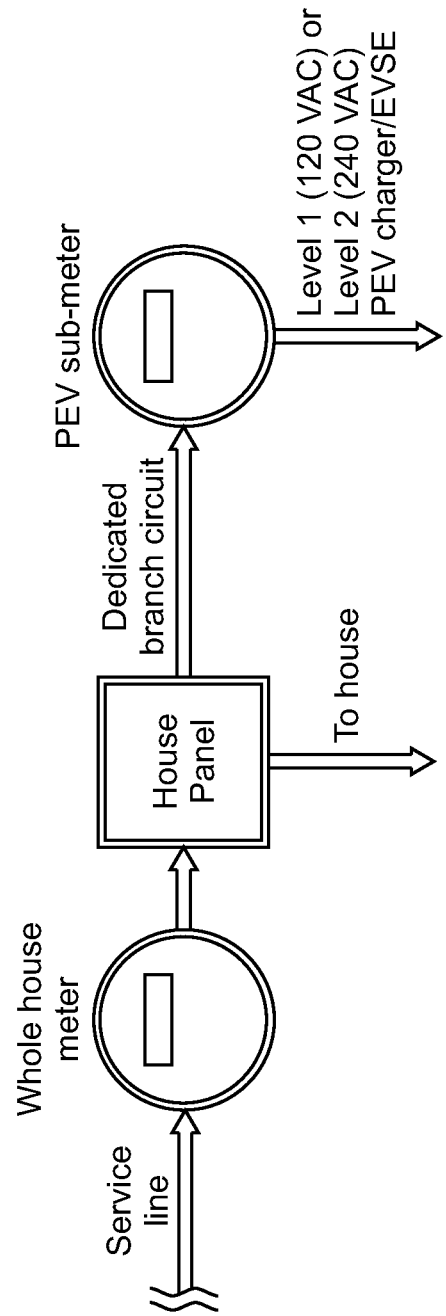
FIG. 2 shows a detection and estimation validation configuration for PEV metering.

SMUD currently offers a Time of Use (TOU) adjusted electricity rate for PEV charging to incentivize off-peak charging. This TOU discount only applies to the PEV load, which therefore requires additional metering capability. For these customers, SMUD offers a second meter behind the whole house meter to bill the PEV charging at a rate structure independent of the whole house. These customers provide a set of confirmed charging cases for which whole house load data is available as well as the PEV load data for validation purposes. FIG. 2 depicts this meter/sub-meter configuration. SMUD uses Landis+Gyr smart meters that sample energy consumption on hourly intervals for residential installations and communicate over a Silver Spring Network.

Between the years 2011-2012, about 312,000 hours of whole house plus PEV sub-metered data was available to evaluate detection performance. Another 312,000 hours of whole house data without a PEV load was used to evaluate false alarm performance. For non-PEV load data, the full set of PEV sub-metered data was replicated with the PEV sub-metered load subtracted from the whole house meter load to represent non-charging homes. It is assumed that the diversity of non-PEV load from the PEV sub-metered homes is statistically representative of non-PEV load for the general population In order to fit or train the detection algorithms, about 25% of the full data set was randomly selected by day and home. All algorithms described herein utilized the same fit/training data and the same validation data.

Support Vector Machine (SVM)

Figure 3A:
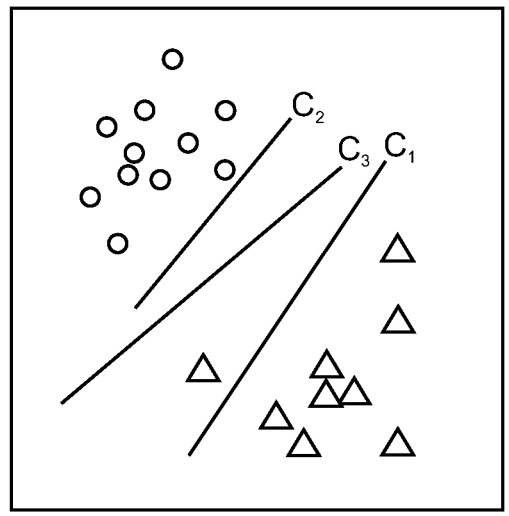
FIG. 3A is a schematic diagram showing multiple generalized linear classifiers.

In the field of machine learning, a Support Vector Machine (SVM) is a supervised learning model that is used to classify and identify data (Du, et al., 2012). For a binary classification case, data points belong to one of two classes. A linear classifier for a q dimensional data vector would be a (q−1) dimensional hyperplane. A linear classifier is chosen to maximize the separation or margin between the two classes. FIG. 3A depicts three linear classifiers $C_1$, $C_2$, and $C_3$ for a hypothetical data set. Both $C_2$ and $C_3$ successfully classify more data than $C_1$. Although $C_2$ and $C_3$ classify a similar amount of data, $C_3$ maximizes the separation between the two classes and is therefore the chosen classifier.

Figure 3B:
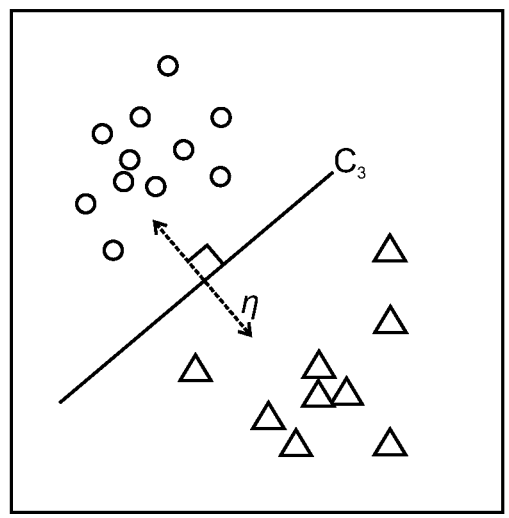
FIG. 3B illustrates a heuristic-modified SVM in a Neyman-Pearson sense.

An SVM could be adapted to classify data in a Neyman-Pearson sense, by moving the classifier hyperplane along its gradient, parameterized by η, as depicted in FIG. 3B and similar to (Fawcett, 2006). Neyman-Pearson signifies a frequentist's approach that yields a tradeoff between Type I and Type II errors—namely missed detection of a hypothesis of interest and false detection of a hypothesis of interest.

The variable x (SINGLE HOME MATRIX) is defined as a vector of hourly whole house meter measurements for one day beginning at 1 PM and ending at 12 PM on the following day $$x = [x_{1PM}, x_{2PM}, \ldots, x_{11AM}, x_{12PM}] \quad (1)$$

The variable μ (NOMINAL DAY MODEL MATRIX) is defined as a time-varying measured vector of hourly mean meter measurements across the population, corresponding to the same time samples as for x $$\mu = [\mu_{1PM}, \mu_{2PM}, \ldots, \mu_{11AM}, \mu_{12PM}] \quad (2)$$

For simplicity and with some abuse of notation, the hourly index offset accounting for day is omitted in (1) and (2). The classifier of FIG. 5 can be described using an $l^2$-norm threshold test shown in (3). This threshold test indicates either a null hypothesis $H_0$ that represents no PEV charging or an alternate hypothesis $H_1$ that represents a PEV charging.

$$\frac{\|x - \mu\|}{\|x - \mu - X_1\|} \underset{H_0}{\overset{H_1}{\gtrless}} \eta \quad (3)$$

In this threshold test, $X_1$ is a parameter vector fit from the training dataset that represents the mean PEV load by corresponding hour of the day for homes with a PEV ($\mu + X_1$ = PEV DAY MODEL MATRIX)

$$X_1 = [0.226, 0.239, 0.242, 0.207, 0.244, 0.289, 0.257,\\
0.253, \ldots 0.236, 1.020, 1.244, 1.439, 1.239, 1.323,\\
0.946, 0.663, \ldots 0.423, 0.301, 0.209, 0.165, 0.116,\\
0.143, 0.149, 0.192] \quad (4)$$

Classic Statistical Detection with the Likelihood Ratio Test (LRT)

Figure 4:
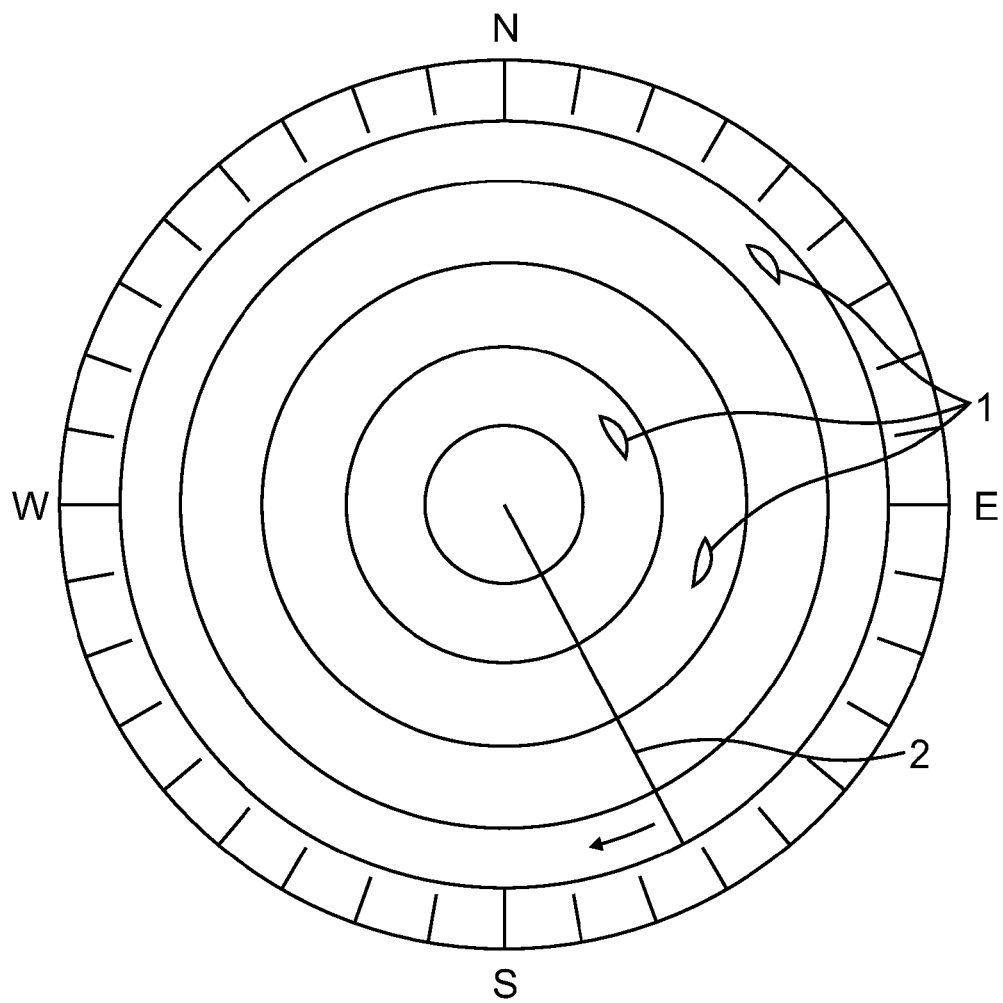
FIG. 4 illustrates a classic binary hypothesis LRT scenario involving radar detection.

Detection techniques are well established in the field of statistical signal processing. In 1933, Egon Pearson and Jerzy Neyman proposed a statistical method for detection, constructed in the form of hypothesis testing. This pioneering approach at the time gained popularity in radar detection, with its first applications in World War II (Westin, 2004). See FIG. 4 LRT Application Example—Is that blip a flying object or a weather disturbance? (Foresman, 2007). Neyman and Pearson followed a frequentist's philosophy and proved how to derive the optimal tradeoff between missed detection of a hypothesis of interest and false detection of a hypothesis of interest.

For a binary hypothesis case (Hero, 2003), given a null hypothesis $H_0$ that reflects the presence of parameter $\Theta_0$ and an alternate hypothesis $H_1$ that reflects the presence of parameter $\Theta_1$, the Neyman-Pearson criteria defines a Likelihood Ratio Test (LRT) for a measurement x as:

$$\Lambda(x) = \frac{f(x \mid \Theta_1)}{f(x \mid \Theta_0)} \quad (5)$$

Where f(·) denotes the probability density function for the measurement conditional on the parameters associated by hypothesis. The binary hypothesis LRT is:

$$\Lambda(x) \underset{H_0}{\overset{H_1}{\gtrless}} \eta \quad (6)$$

The optimal tradeoff between Type I and Type II errors is commonly represented as the Receiver Operating Characteristic (ROC) curve. The ROC curve plots the probability of successful detection (represented as β) versus the probability of false detection (depicted as α). The value of η selects the performance tradeoff on the ROC curve as follows:

$$\alpha(\eta) = \int_{S_{H_1}(\eta)} f(x \mid \Theta_0) \, dx \quad (7)$$

$$\beta(\eta) = \int_{S_{H_1}(\eta)} f(x \mid \Theta_1) \, dx \quad (8)$$

Where $$S_{\mathcal{H}1}(\eta) = \{x : \mathcal{H}_1\} \quad (9)$$

Figure 5:
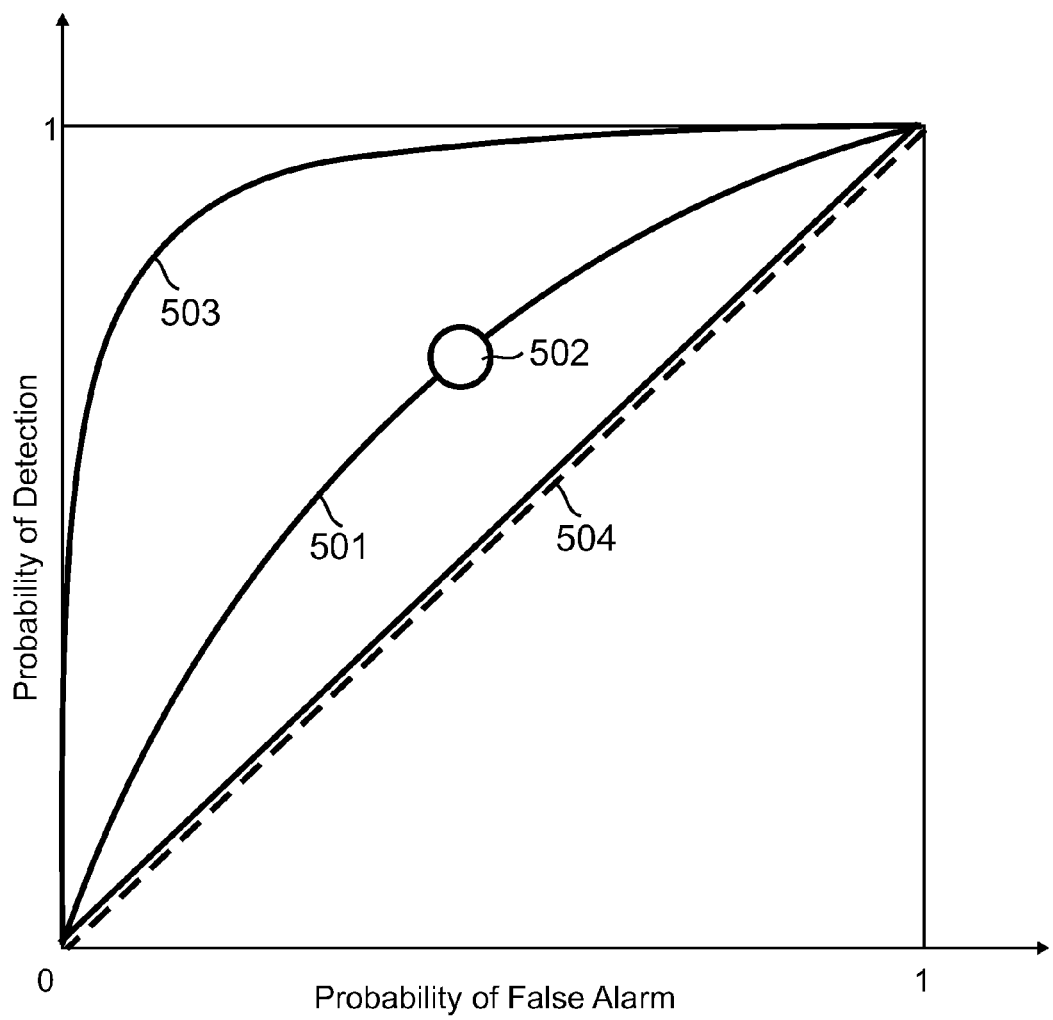
FIG. 5 shows an example of receiver operating characteristic (ROC) curves.

FIG. 5 generalizes the concept of an ROC curve. Curve 501 (sample ROC curve) represents the empirical performance of a single detection methodology. Dot 502 represents a single detection algorithm using the same methodology as curve 501. Curve 503 represents the empirical performance of another detection methodology. The detection methodology of curve 503 is superior to the detection methodology of the curve 501, since given a certain probability of false alarm the probability of detection on curve 503 exceeds the probability of detection on the curve 501. A worst case ROC curve is the chance line 504. Chance line 504 reflects the performance of a randomized selection choice. In other words a weighted coin flip would result in a detection and false alarm performance that lies on the chance line.

An LRT is similar to an SVM in the sense of partitioning data sets between two hypotheses. The difference is that an SVM selects the classifier based on the Euclidean metric while an LRT selects the equivalent of a classifier based on statistical likelihood. Depending on the implementation of an LRT, the classifier may be nonlinear (a hypersurface rather than a hyperplane), analogous to the "kernel trick" applied to SVM. Furthermore, depending on the implementation of an LRT, it may also yield a time-varying classifier.

LRT for Hourly Meter Measurement

The simplest LRT case is for a single meter read sample. SMUD residential smart meters are configured to sample at hourly intervals. The hourly load Probability Density Function (PDF) is approximated as a skew normal distribution for only positive values of measured whole house load x (a random variable; this assumes one way flow of power and therefore excludes back-feed from residential solar power and Vehicle-to-Grid (V2G) power flow) at the kth sample such that the total probability is unity:

$$f_{hourly}(x_k \mid \Theta_k) = \begin{cases} 0, & x_k < 0 \\ f_{skewnormal}(x_k \mid \Theta_k) + f_{skewnormal}(-x_k \mid \Theta_k), & x_k \geq 0 \end{cases} \quad (10)$$

The statistical parameter $\Theta$ is a time-varying matrix and uniquely corresponding to the time of measured load x at the kth sample:

$$\Theta_k = [\mu_k, \sigma_k, A_k] \quad (11)$$

Figure 6:
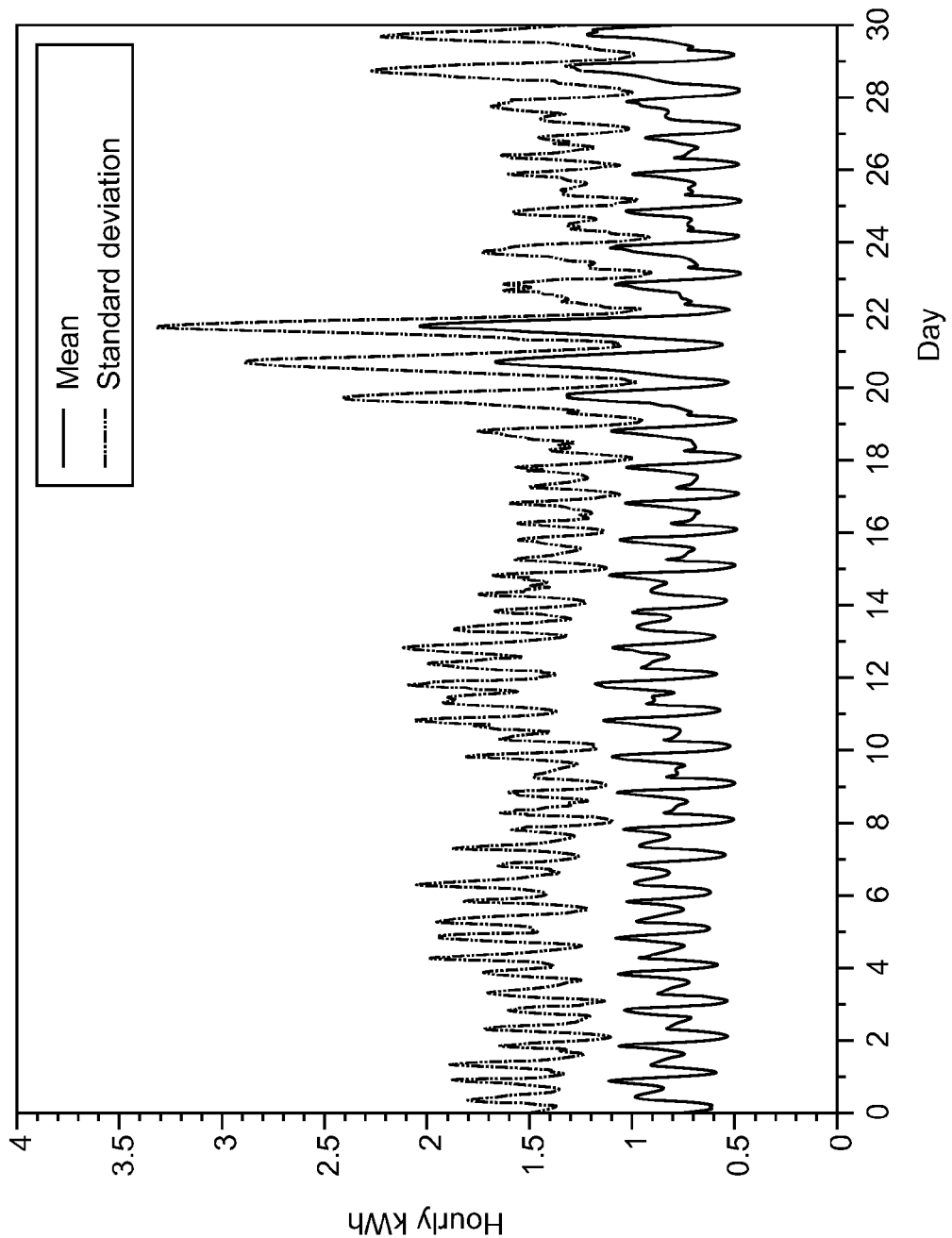
FIG. 6 shows SMUD residential mean and standard deviation of whole house meter load for April 2012.

For which, $\mu$=mean, $\sigma$=standard deviation, and A=shape. SMUD's meter data collection system allows for easy access to raw meter data and summary statistics such as mean and standard deviation across a superset for a given time sample. For simplicity, the shape A is assumed to be constant for all data at a value of 4. The time varying values for mean $\mu$ and standard deviation $\sigma$ are calculated for the entire population of 550,000 residential meters. FIG. 6 shows a sample of calculated mean and standard deviation for hourly meter measurements of kWh for the month of April 2012.

For the skew normal distribution, the sign and magnitude of the shape measure correspond qualitatively to skewness. The standard equations for a skew normal distribution are as follows:

$$f_{skewnormal}(x \mid \Theta) = f_{normal}(x, \xi, \omega) \mathrm{erfc}\left(-A \frac{x-\xi}{\omega\sqrt{2}}\right) \quad (12)$$

$$f_{normal}(x, \xi, \omega) = \frac{1}{\omega\sqrt{2\pi}} e^{-\frac{(x-\xi)^2}{2\omega^2}} \quad (13)$$

$$\mathrm{erfc}(z) = \frac{2}{\sqrt{\pi}} \int_z^\infty e^{-t^2} dt \quad (14)$$

$$\omega = \sqrt{\frac{\sigma^2}{1 - \frac{2\delta^2}{\pi}}} \quad (15)$$

$$\xi = \mu - \omega\delta\sqrt{\frac{2}{\pi}} \quad (16)$$

$$\delta = \frac{A}{\sqrt{1+A^2}} \quad (17)$$

Figure 7:
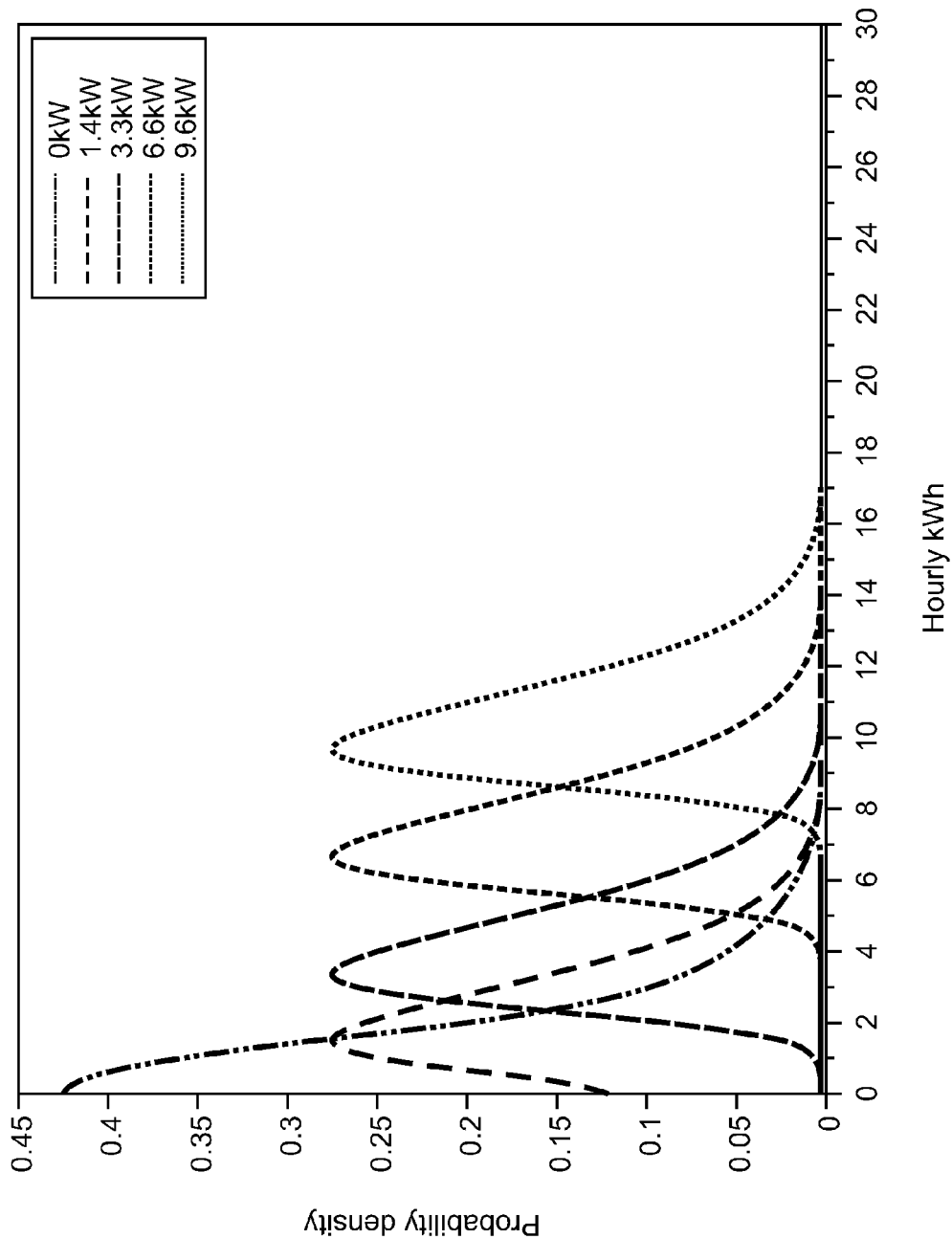
FIG. 7 shows sample probability density functions for whole house energy consumption at hourly intervals for different PEV charging rates.

FIG. 7 plots (10) at different mean charge rates. Thus, FIG. 7 shows the sample probability density functions for whole house energy consumption at hourly intervals for different PEV charging rates The null and alternate hypotheses for the kth load measurement are described by the following parameters given a charging rate of R:

Null Hypothesis: $\Theta_{0,k} = [\mu_k, \sigma_k, A_k]$

Alternate Hypothesis: $\Theta_{1,k}(R) = [\mu_k + R, \sigma_k, A_k]$

Figure 8:
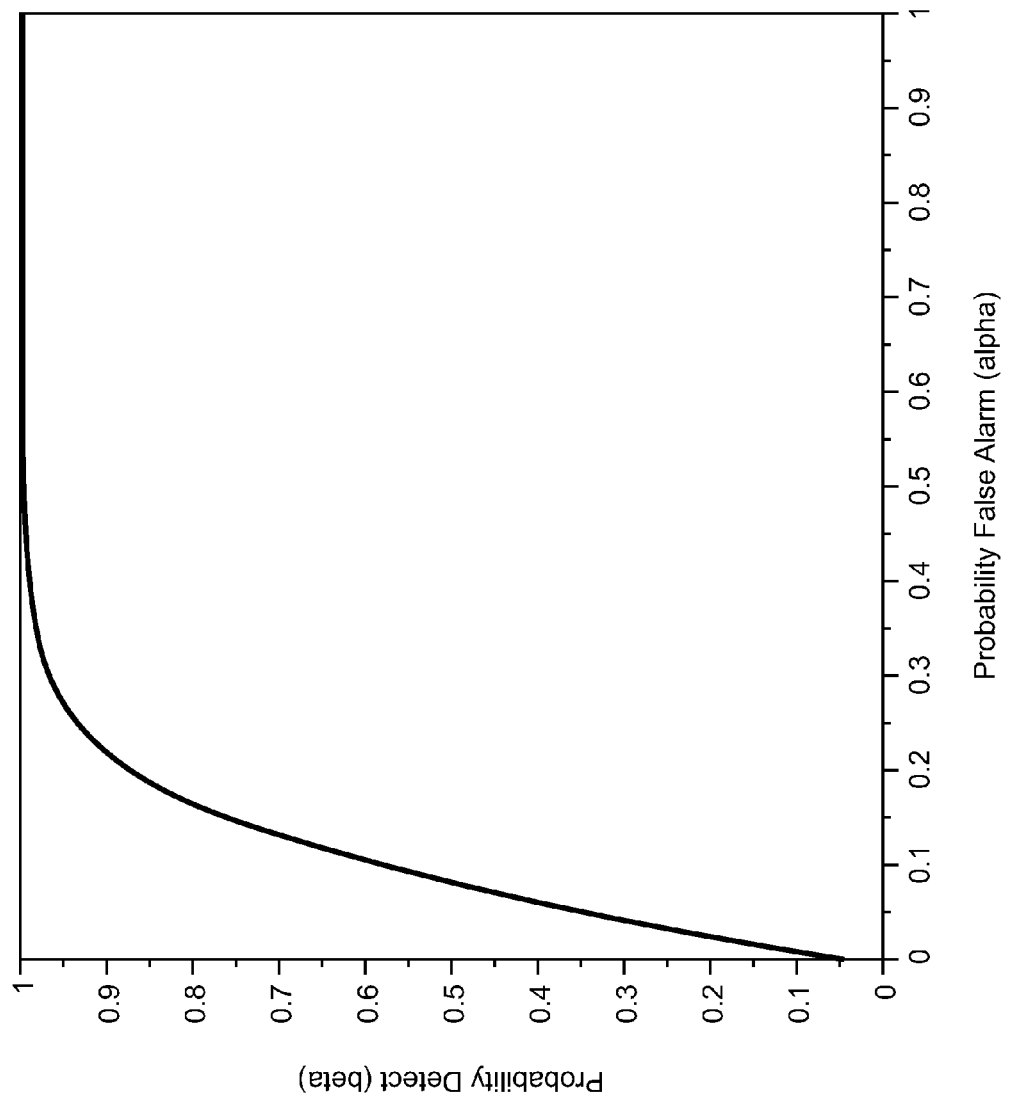
FIG. 8: shows a theoretical ROC curve for whole house energy consumption at hourly intervals for a 3.3 kW PEV charging.

The application of the binary hypothesis LRT of (6) to (10) for a charge rate of R=3.3 kW yields a theoretical ROC curve shown in FIG. 8. The theoretical curve is an upper bound (best possible case) for real world application of the LRT.

Figure 9:
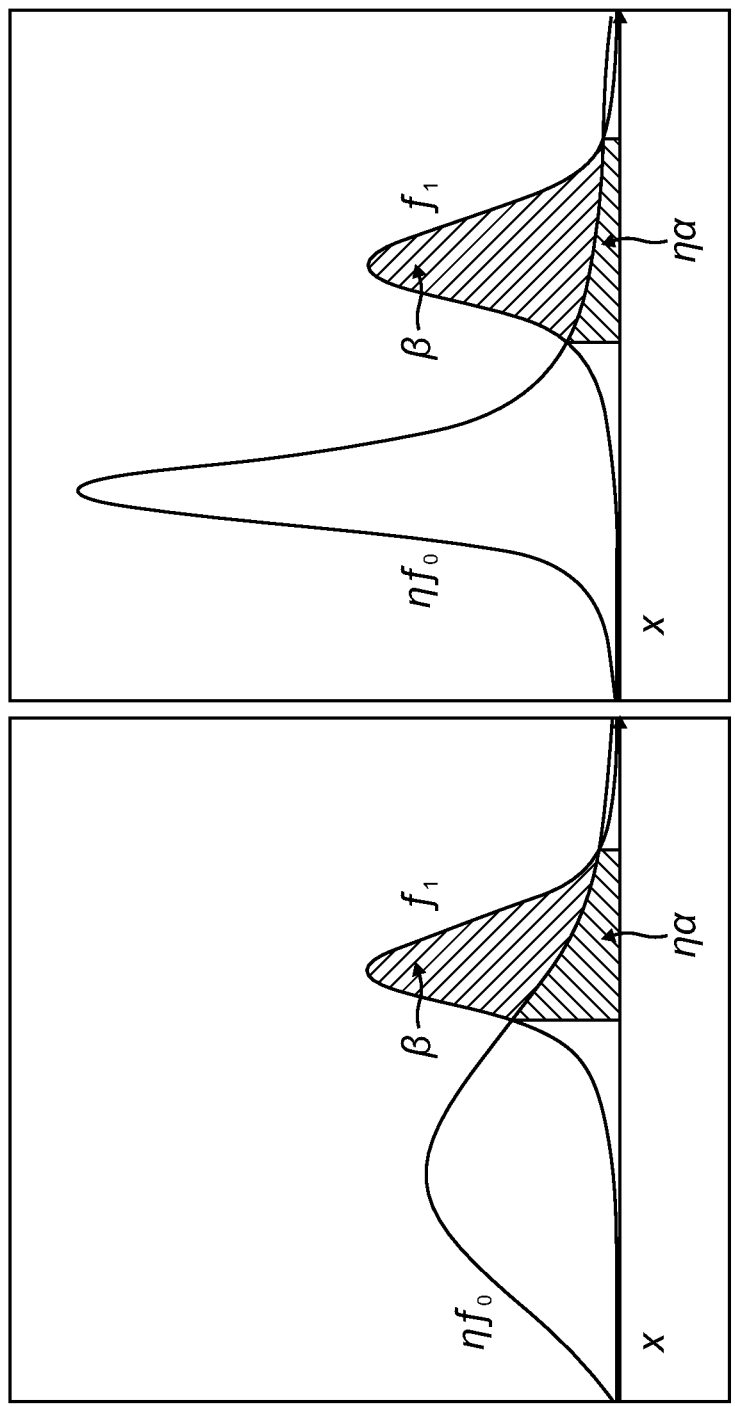
FIG. 9 shows a hypothetical comparison of two pairs of null and alternate hypothesis probability density functions (PDFs) for identical means and LRT threshold but different standard deviations.

Several variations of the LRT may improve the quality of detection. A higher standard deviation leads to a greater overlap of the null and alternate hypothesis PDFs, which tends to reduce the ROC performance. FIG. 9 illustrates how the same means and LRT thresholds for two pairs of null and alternate hypothesis of different standard deviations perform differently. In the case of FIG. 9, although the detection probabilities ($\beta$) are visually similar, the false alarm probability ($\alpha$) for the case of the null hypothesis with higher standard deviation is visually lower than the case with the lower standard deviation. Therefore FIG. 9 illustrates, that generally the quality of detection can be improved by segmenting the population into groups that individually have lower standard deviations for the null and alternate hypothesis PDFs. Market segmentation is commonly used in smart meter analytic tools. For example, smart meter analytic solution providers advertise leveraging data from a variety of sources including CIS/MDM systems, business listings, premise data, and demographic data (among other categories) to help segment or filter the population into sub-groups that are easier to analyze. The whole meter population used for market statistics in the methods of the invention may, for example, be segmented according to such criteria prior to temporal segmentation/adaptive detection process. A high-value criterion for market segmentation is customer rate plan. Different rate plans can incentivize different energy consumption patterns, and subsequently affect whole house and PEV energy consumption profiles.

Method embodiments of the present invention that employ a temporal segmentation/adaptation to the detection process approach are further described with respect to the appended figures as follows.

Figure 10:
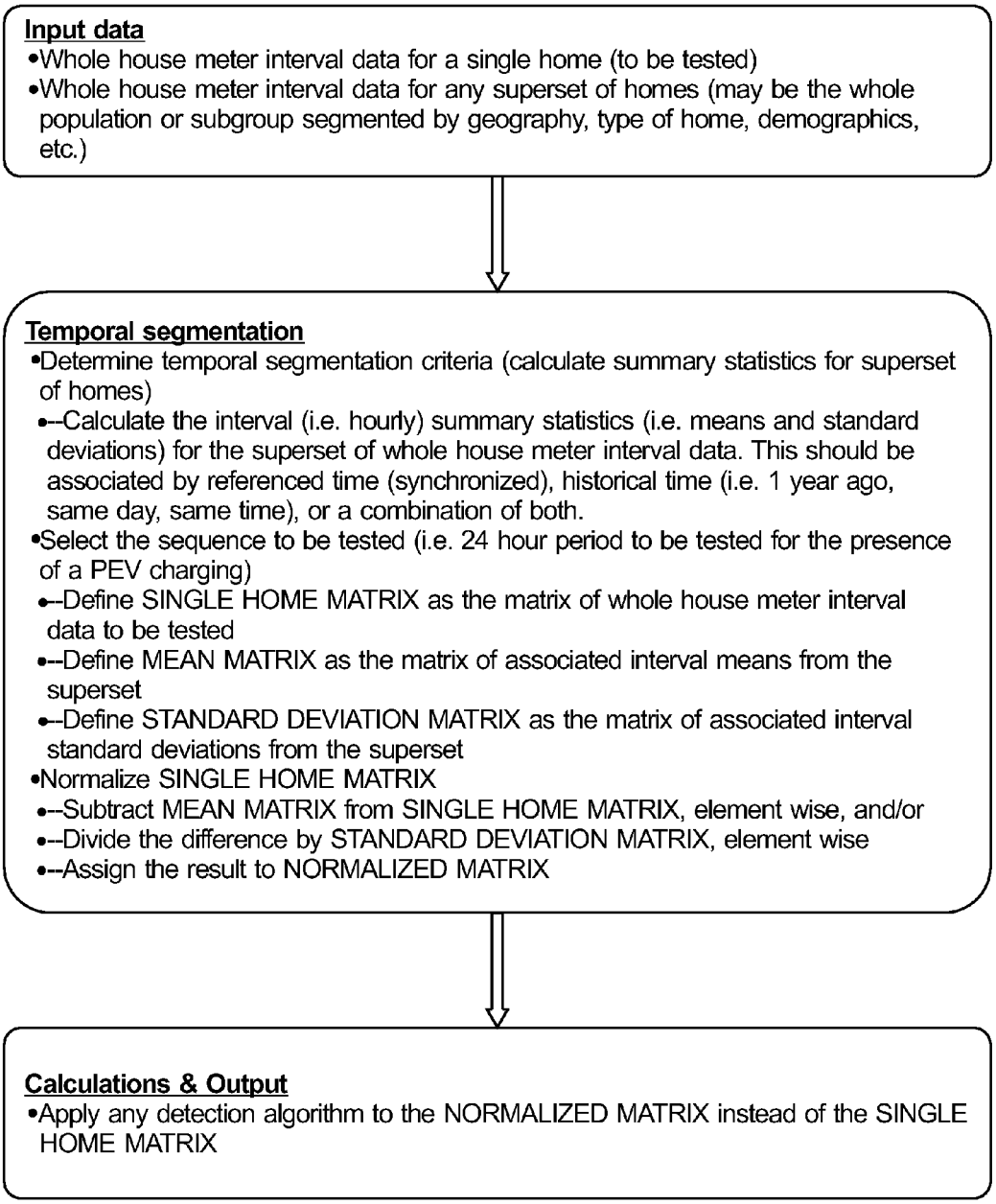
FIG. 10 is a flowchart showing a generalized temporal segmentation for PEV charging detection method embodiment of the invention.

FIG. 10 exemplifies a generalized temporal segmentation/adaptation for PEV charging detection method embodiment of the invention, which may be computer-implemented. In a first step, Input Data is provided that includes: (i) whole house meter interval data for a single home (to be tested); and (ii) whole house meter interval data for any superset of homes (may, for example, be the whole population or subgroup segmented by geography, type of home, demographics, etc.)

Next, in a Temporal Segmentation/Adaptation sub-process, the following steps and sub-steps may be performed:
Determining temporal segmentation/adaptation criteria (calculate summary statistics for superset of homes)
Calculating the interval (i.e. hourly) summary statistics (i.e. means and standard deviations) for the superset of whole house meter interval data. This should be associated by referenced time (corresponding to the same times), historical time (i.e. 1 year ago, same day, same time), or a combination of both.
Selecting the sequence to be tested (i.e. 24 hour period to be tested for the presence of a PEV charging)
Defining SINGLE HOME MATRIX as the matrix of whole house meter interval data to be tested
Defining MEAN MATRIX as the matrix of corresponding interval means from the superset (a single mean corresponding to each interval, taken across all superset elements for that same interval)
Defining STANDARD DEVIATION MATRIX as the matrix of corresponding interval standard deviations from the superset (a single standard deviation corresponding to each interval, taken across all superset elements for that same interval)
Normalizing the SINGLE HOME MATRIX
Subtracting MEAN MATRIX from SINGLE HOME MATRIX, element wise, and/or
Dividing the difference by STANDARD DEVIATION MATRIX, element wise
Assigning the result to NORMALIZED MATRIX Now, any detection algorithm, such as a binary hypothesis test, may be applied to the NORMALIZED MATRIX instead of the SINGLE HOME MATRIX to obtain the output determination of whether a PEV is present or not (according to the algorithm). Such determinations may be stored in a data structure in tangible computer memory of a computer system, such as in a relational database, such as a customer database in which it is associated with customer information. Customer billing rates and billing plans may be assigned to a customer at least in part based on the determination of whether a PEV is present at the customer's metering location (home). For example, if a PEV is detected, the customer may be charged a reduced billing rate for consumption. More generally, one or more incentives may be provided to a customer for whom PEV charging is detected. It should be understood that the process may be repeated for each of a plurality of homes (meter locations) to be tested for detection of PEV charging. Detection of PEVs also provides early identification of electric vehicle charging locations for more detailed distribution infrastructure load analysis to assess what type of distribution infrastructure upgrade may be needed for pole mount or pad mount service transformers and associated wiring to maintain a certain reliability performance.

Figure 11:
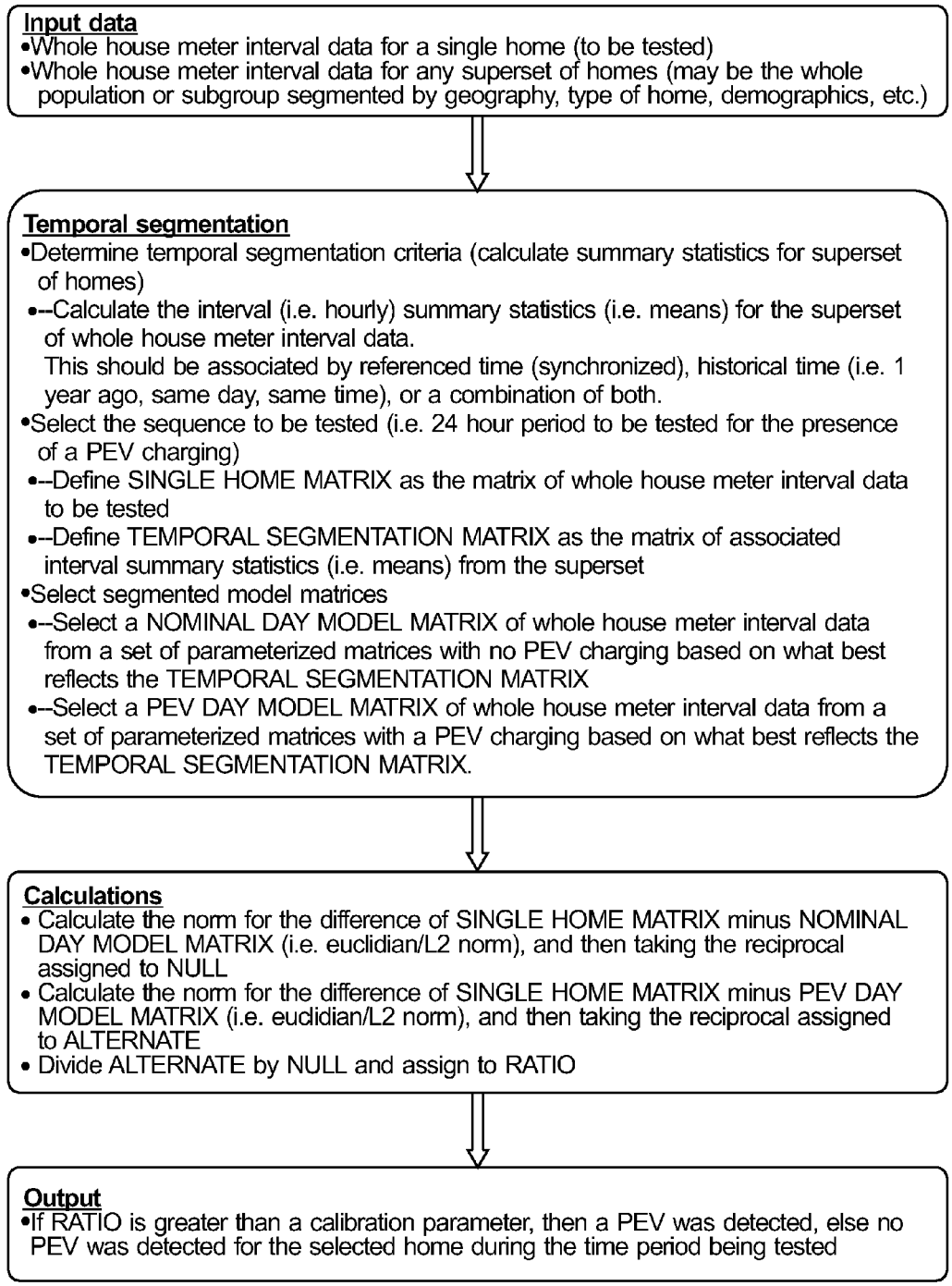
FIG. 11 a flowchart showing a Support Vector Machine (SVM) with temporal segmentation for PEV charging detection method embodiment of the invention.

FIG. 11 exemplifies a Support Vector Machine (SVM) with temporal segmentation/adaptation for PEV charging detection method embodiment of the invention, which may be computer-implemented. In a first step, Input Data is provided that includes: (i) whole house meter interval data for a single home (to be tested); and (ii) whole house meter interval data for any superset of homes (may, for example, be the whole population or subgroup segmented by geography, type of home, demographics, etc.)

Next, in a Temporal Segmentation/Adaptation sub-process, the following steps and sub-steps may be performed:
Determining temporal segmentation/adaptation criteria (calculate summary statistics for superset of homes)
Calculating the interval (i.e. hourly) summary statistics (i.e. means) for the superset of whole house meter interval data. This should be associated by referenced time (corresponding to the same times), historical time (i.e. 1 year ago, same day, same time), or a combination of both.
Selecting the sequence to be tested (i.e. 24 hour period to be tested for the presence of a PEV charging)
Defining the SINGLE HOME MATRIX as the matrix of whole house meter interval data to be tested (x); and
Defining the TEMPORAL SEGMENTATION MATRIX as the matrix of corresponding interval summary statistics (i.e. means) from the superset ($\mu$).
Selecting segmented model matrices
selecting a NOMINAL DAY MODEL MATRIX of whole house meter interval data from a set of matrices that reflect no PEV charging based on which matrix has the smallest norm (i.e. Euclidean/L2 norm) of difference with respect to the TEMPORAL SEGMENTATION MATRIX (so NOMINAL DAY MODEL MATRIX$\approx\mu$=TEMPORAL SEGMENTATION MATRIX, but for an infinite set of matrices, NOMINAL DAY MODEL MATRIX=$\mu$=TEMPORAL SEGMENTATION MATRIX) (One way to generate the set of matrices representative of no PEV charging for a similar corresponding time interval is to suppose that 36 matrices are chosen, where 3 matrices are representative of types of 24 hour load profiles for each month of the year, e.g., January weekday profile, January weekend profile, January holiday profile, February weekday profile, etc. Another way to define the NOMINAL DAY MODEL MATRIX is to set this equal to the TEMPORAL SEGMENTATION MATRIX, which makes the nominal day model inherently representative of the superset population); and
generating a PEV DAY MODEL MATRIX of whole house meter interval data that is the element-wise sum of the NOMINAL DAY MODEL MATRIX plus a predetermined sequence of PEV charging load that is typical for the time period selected ($\mu+X_1$);
Next, the following calculations and output determination may be performed.
calculating the norm for the difference of SINGLE HOME MATRIX minus NOMINAL DAY MODEL MATRIX (i.e. euclidian/L2 norm) and then taking the reciprocal, assigned to NULL (=$1/\|x-\mu\|$);
calculating the norm for the difference of SINGLE HOME MATRIX minus PEV DAY MODEL MATRIX (i.e. euclidian/L2 norm) and then taking the reciprocal, assigned to ALTERNATE(=$1/\|x-(\mu+X_1)\|$=$1/\|x-\mu-X_1\|$);
Dividing ALTERNATE by NULL and assign to RATIO; and
Making the determination: if RATIO is greater than a preselected/predetermined calibration parameter, then a PEV was detected, else no PEV was detected for the selected home during the time period being tested.

Again, such determinations may be stored in a data structure in tangible computer memory of a computer system, such as in a relational database, such as a customer database in which it is associated with customer information. Customer billing rates and billing plans may be assigned to a customer at least in part based on the determination of whether a PEV is present at the customer's metering location (home). For example, if a PEV is detected, the customer may be charged a reduced billing rate for consumption. More generally, one or more incentives may be provided to a customer for whom PEV charging is detected. It should be understood that the process may be repeated for each of a plurality of homes (meter locations) to be tested for detection of PEV charging. Detection of PEVs also provides early identification of electric vehicle charging locations for more detailed distribution infrastructure load analysis to assess what type of distribution infrastructure upgrade may be needed for pole mount or pad mount service transformers and associated wiring to maintain a certain reliability performance.

Figure 12:
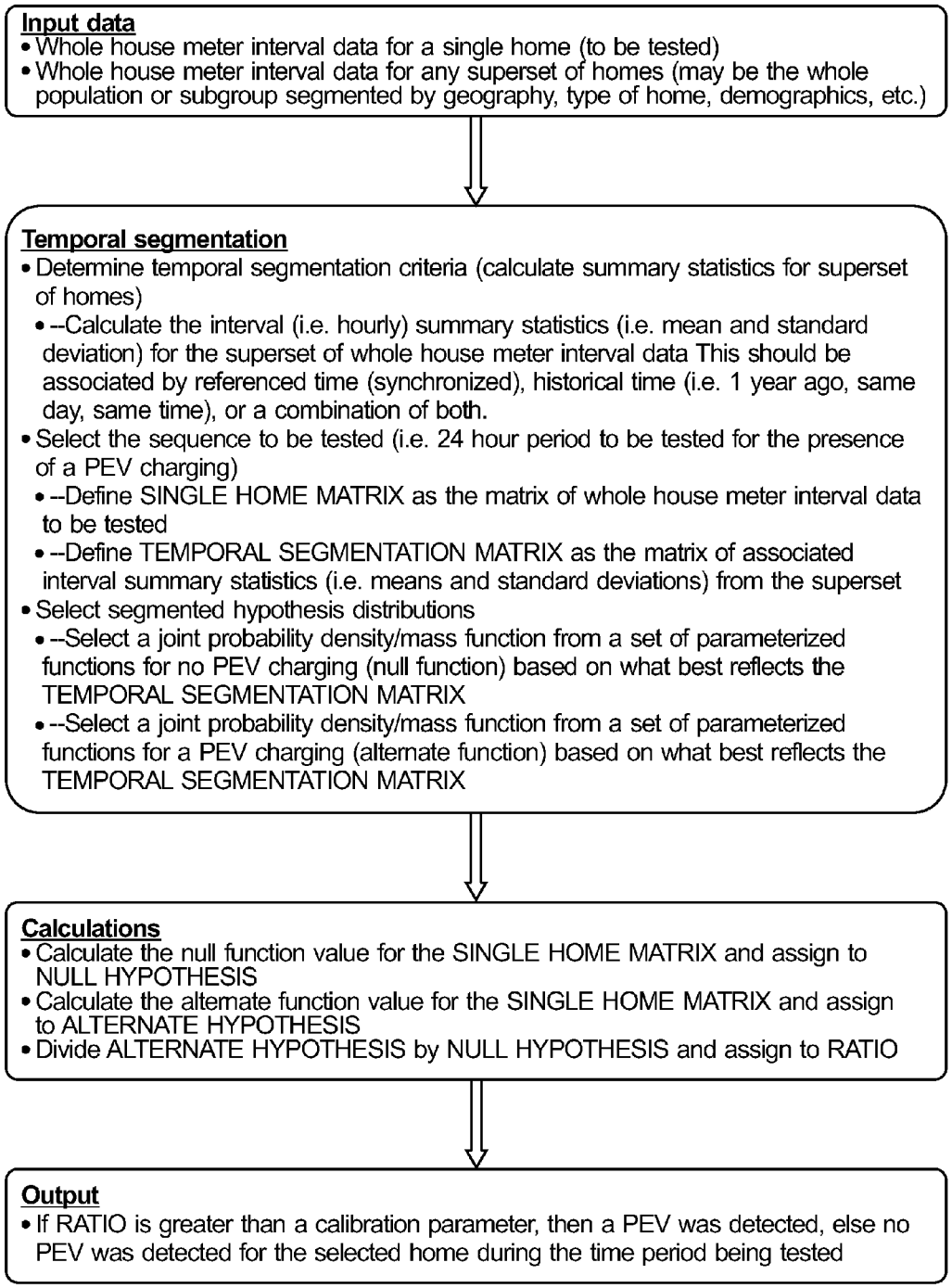
FIG. 12 is a flowchart showing a Likelihood Ratio Test (LRT) with temporal segmentation/adaptation for PEV charging detection method embodiment of the invention.

FIG. 12 exemplifies a Likelihood Ratio Test (LRT) with temporal segmentation/adaptation for PEV charging detection method embodiment of the invention, which may be computer-implemented. In a first step, Input Data is provided that includes: (i) whole house meter interval data for a single home (to be tested); and (ii) whole house meter interval data for any superset of homes (may, for example, be the whole population or subgroup segmented by geography, type of home, demographics, etc.)

Next, in a Temporal Segmentation/Adaptation sub-process, the following steps and sub-steps may be performed:
Determining temporal segmentation/adaptation criteria (calculate summary statistics for superset of homes)
Calculating the interval (i.e. hourly) summary statistics (i.e. mean and standard deviation) for the superset of whole house meter interval data. This should be associated by referenced time (corresponding to the same times), historical time (i.e. 1 year ago, same day, same time), or a combination of both.
Selecting the sequence to be tested (i.e. 24 hour period to be tested for the presence of a PEV charging)
Defining SINGLE HOME MATRIX as the matrix of whole house meter interval data to be tested
Defining one or both of:
a MEAN MATRIX which is a matrix of corresponding interval means from the superset ($\mu$), and
a STANDARD DEVIATION MATRIX which is a matrix of corresponding interval standard deviations from the superset ($\sigma$); and
Defining a TEMPORAL SEGMENTATION MATRIX which is a concatenated matrix of MEAN MATRIX and STANDARD DEVIATION MATRIX [$\mu$, $\sigma$].
Selecting segmented hypothesis distributions
Selecting a joint probability density/mass function from a set of parameterized functions for no PEV charging (null function) based on which function's corresponding matrix of concatenated means and standard deviations has the smallest norm (i.e. Euclidean/L2 norm) of difference with respect TEMPORAL SEGMENTATION MATRIX; and
Generating a joint probability density/mass function for a PEV charging (alternate function) by adding a mean and standard deviation adjustment to the null function which could be as simple as a constant mean offset by charge rate R or a time-weighted offset for mean and standard deviation constant (simple):

$\Theta_{1,k}(R) = [\mu_k + R, \sigma_k, A_k]$ weighted (sophisticated):—The Probability Mass Function (PMF) for PEV charge start time s is defined as $f_{s,R}(s)$ and the PMF for daily PEV energy consumption e is defined as $f_{e,R}(e)$.):

$$f_{daily}(x \mid \Theta_1(R)) \approx \sum_{(e)} \sum_{(s)} f_{daily}(x \mid \Theta_1(R), s, e) f_{s,R}(s) f_{e,R}(e).$$

Next, the following calculations and output determination may be performed.
Calculating the null function value for the SINGLE HOME MATRIX and assign to NULL HYPOTHESIS;
Calculating the alternate function value for the SINGLE HOME MATRIX and assign to ALTERNATE HYPOTHESIS;
Dividing ALTERNATE HYPOTHESIS by NULL HYPOTHESIS and assign to RATIO; and
Making the determination: if RATIO is greater than a preselected/predetermined calibration parameter, then a PEV was detected, else no PEV was detected for the selected home during the time period being tested.

Again, such determinations may be stored in a data structure in tangible computer memory of a computer system, such as in a relational database, such as a customer database in which it is associated with customer information. Customer billing rates and billing plans may be assigned to a customer at least in part based on the determination of whether a PEV is present at the customer's metering location (home). For example, if a PEV is detected, the customer may be charged a reduced billing rate for consumption. More generally, one or more incentives may be provided to a customer for whom PEV charging is detected. It should be understood that the process may be repeated for each of a plurality of homes (meter locations) to be tested for detection of PEV charging. Detection of PEVs also provides early identification of electric vehicle charging locations for more detailed distribution infrastructure load analysis to assess what type of distribution infrastructure upgrade may be needed for pole mount or pad mount service transformers and associated wiring to maintain a certain reliability performance.

The various steps of the invention and its embodiments and variations may be performed by at least one computer processor, for example, by at least one computer processor in conjunction with tangible processor-accessible memory, the memory having stored therein (i) computer instructions configured to direct the processor to carry out the steps of the invention and (ii) the input data required to carry out the methods.

The invention also provides computer systems for detecting PEV charging that include: at least one processor; and tangible processor-accessible memory, the processor-accessible memory including stored therein computer instructions configured to direct the processor to carry out the steps of the invention and/or any of its embodiments and variations described herein. The memory may also at least transiently include stored therein the input data that is operated upon according to the invention. Such systems may also include input and output devices such as keyboards, displays, printers, etc., as known in the art.

Figure 13:
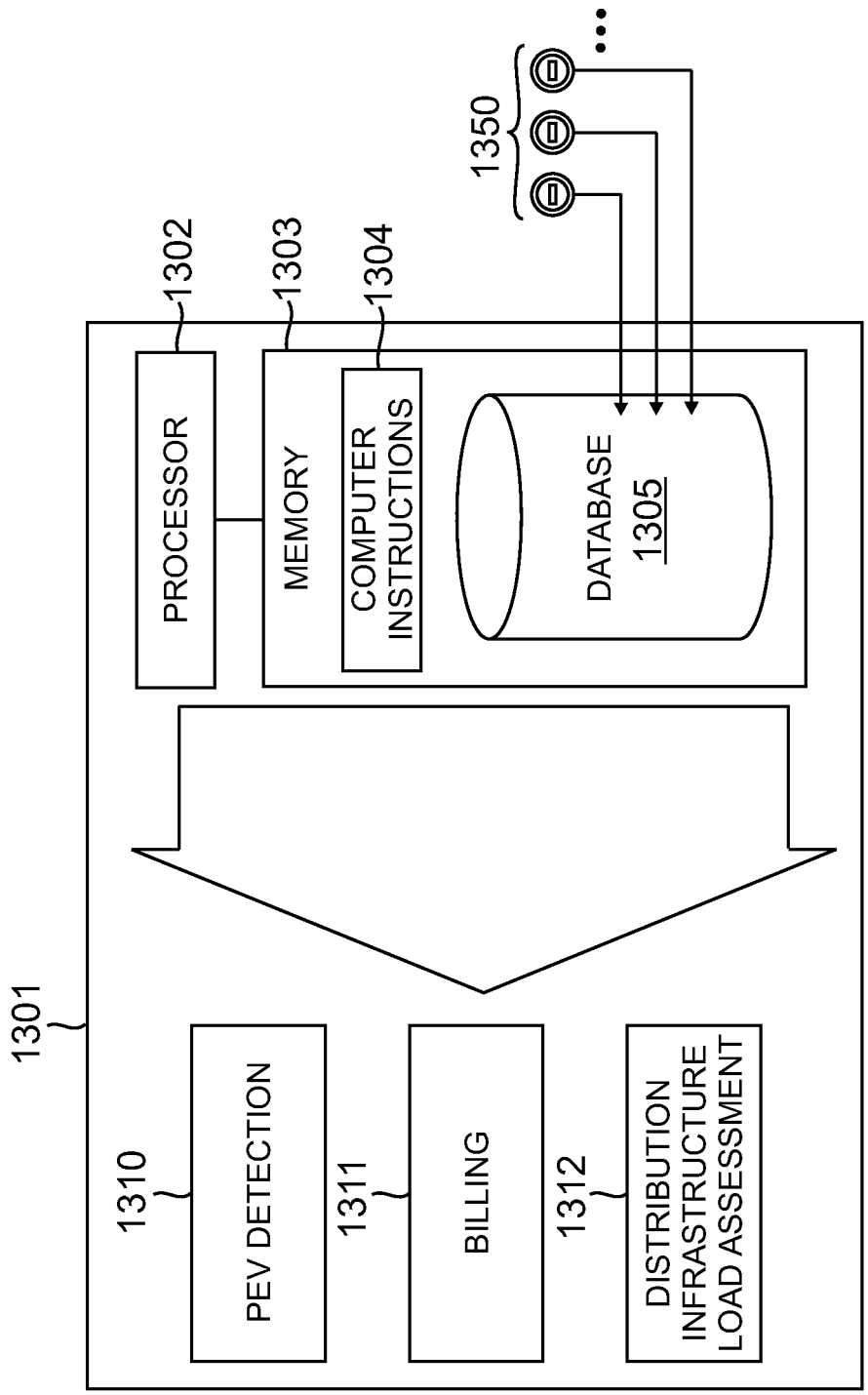
FIG. 13 shows a computer system embodiment of the invention.

FIG. 13 shows a computer system embodiment 1301 of the invention. System 1301 includes a processor operably connected to tangible processor-accessible memory 1303. Memory 1303 includes processor-executable computer instructions 1304 and database 1305. Computer instructions 1304 are configured to direct the processor to carry out the various steps of any of the methods of the invention described herein. The system is configured to receive and store in database 1305 the interval meter data from a plurality of whole house electrical meters 1350 and also to store in database 1305 the PEV detection determinations made by the system for particular meter locations. The components of system 1301 operate together to provide a PEV detection module 1310, a customer billing module 1311 which may be configured to base billing in part on whether a PEV has been detected for a customer's meter, and a distribution infrastructure load assessment module 1312 that may take into account PEV detection determinations made by PEV detection module 1310. Distribution infrastructure load assessment module 1312 may, for example, be configured to generate reports regarding present distribution infrastructure load requirements and capabilities and gauge the need for upgrades in view of trends in usage, such as the pace of PEV adoption and charging in a given area.

While the invention is particularly advantageous in the context of PEV charging, it may also be applied to appliances as long as their load appears over multiple interval measurements. For example, the invention may be applied with respect to detection of variable speed or traditional refrigeration or HVAC systems. Accordingly, the invention also provides that each of the embodiments and variations thereof described herein may be applied more generally to detection of an appliance, rather than solely for a PEV.

REFERENCES

Berkheimer, J., Tang, J., Boyce, B., & Aswani, D. (2013). *Electric Grid Integration Costs for Plug-In Electric Vehicles*. Sacramento, Calif.: Sacramento Municipal Utility District.

Chen, C., Torre, W. V., Lyle, C., Colson, B. L., Fan, E. S., & Kolluru, P. (2012). Patent No. US 2012/0123709 A1—Method for detection of plug-in electric vehicle charging via interrogation of smart meter data. United States.

Du, L., Yang, Y., He, D., Harley, R. G., Habetler, T. G., & Lu, B. (2012). Support Vector Machine Based Methods For Non-Intrusive Identification of Miscellaneous Electric Loads. *Annual Conference IEEE Industrial Electronics Society* (pp. 4866-4871). Montreal, QC: IEEE.

EPRI. (2013). *Non-Intrusive Load Monitoring (NILM) Technologies for End-Use Load Disaggregation—Laboratory Evaluation I*. Palo Alto: Electric Power Research Institute. 3002001526.

Fawcett, T. (2006, June). An introduction to ROC analysis. *Pattern Recognition Letters* 27, pp. 861-874.

Foresman, P. S. (2007, November 29). *Public Domain Image*. Retrieved from Wikimedia Commons Hart, G. W. (1992). Nonintrusive appliance load monitoring. *Proceedings of the IEEE*, 80(12):1870-1891.

Hart, G. W., Edward, K. C., & Fred, S. C. (1989). U.S. Pat. No. 4,858,141 A—Non-intrusive appliance monitor apparatus. United States.

Hero, A. (2003). *Statistical Methods for Signal Processing—Estimation, Filtering, and Detection*. Ann Arbor, Mich.: Ulrichs.

Lee, C., Maitra, A., & Short, T. (2013). Automated Discovery of PEV Charging Using Meter Data: Algorithm Development. *EPRI Power Delivery & Utilization Advisory Meeting*. Baltimore, Md.: EPRI.

Mashima, D., & Cárdenas, A. (2012). Evaluating Electricity Theft Detectors in Smart Grid Networks. *15th International Symposium, Research in Attacks, Intrusions, and Defenses* (pp. 210-229). Amsterdam, The Netherlands: Springer Berlin Heidelberg.

Tamor, M. (2013). Global Vehicle Usage Studies (aka who can use an electric car?). *SAE Hybrid & Electric Vehicle Symposium*. Anaheim: Society of Automotive Engineers.

Vacek, M. (2008, June 26). *Public Domain Image*. Retrieved from Wikimedia Commons: http://commons.wikimedia.org/wiki/File:Wiener_filter_-_my_dog.JPG Weiss, M., Helfenstein, A., Mattern, F., & Thorsten, S. (2012). Leveraging smart meter data to recognize home appliances. *Pervasive Computing and Communications (PerCom), International Conference on* (pp. 190-197). Lugano: IEEE.

Westin, L. K. (2004). *Receiver operating characteristic (ROC) analysis—Evaluating discriminance effects among decision support systems*. SE-90187 Umeå, Sweden: Umeå University.

Zhang, P., Zhou, C., Stewart, B. G., Hepburn, D. M., Zhou, W., & Yu, J. (2011). An Improved Non-Intrusive Load Monitoring Method for Recognition of Electric Vehicle Battery Charging Load. *International Conference on Smart Grid and Clean Energy Technologies* (pp. 104-112). Chengdu, China: Elsevier Ltd.

Zhong, S., & Tam, K.-S. (2012). A Frequency Domain Approach to Characterize and Analyze Load Profiles. *IEEE Transactions on Power Systems*, 27(2), 857-865.

Each of the patents and other publications cited herein is hereby incorporated by reference in its entirety as if fully set forth herein.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A computer-implemented method for detecting plug-in electrical vehicle (PEV) charging at a whole house electrical meter location, comprising the steps of:
   providing a plurality of whole house electrical meters, wherein each whole house electrical meter is located at a particular whole house electrical meter location, and provides input data regarding that particular whole house electrical meter location;
   retrieving the input data from a tangible computer memory, said input data including (i) whole house meter interval data for a single whole house meter location to be tested and (ii) whole house meter interval data for a superset of whole house meter locations;
   calculating time-referenced summary statistics comprising one or both of the means and standard deviations for the whole house meter interval data for the superset;
   selecting a time period for testing a location for PEV charging;
   generating a SINGLE HOME MATRIX which is a matrix of whole house meter interval data to be tested;
   generating one or both of:
      a MEAN MATRIX which is a matrix of corresponding interval means from the superset, and
      a STANDARD DEVIATION MATRIX which is a matrix of corresponding interval standard deviations from the superset;

normalizing the SINGLE HOME MATRIX using one or both of the MEAN MATRIX and the STANDARD DEVIATION MATRIX to generate a NORMALIZED MATRIX;

applying a binary hypothesis test to the NORMALIZED MATRIX to obtain a determination of whether PEV charging is present at the single whole house meter location;

and storing a record of the determination in tangible computer memory.

2. The computer-implemented method of claim 1, wherein the superset of whole house meter locations is selected from the group consisting of the whole population of whole house meter locations.

3. The computer-implemented method of claim 1, wherein the superset of whole house meter locations is a subgroup of the whole population of whole house meter locations.

4. The computer-implemented method of claim 3, wherein the subgroup is a subgroup of the whole population of whole house meter locations based on one or more of geographical location, type of home and demographics.

5. The computer-implemented method of claim 1, wherein the step of normalizing the SINGLE HOME MATRIX to generate a NORMALIZED matrix, comprises:
element-wise subtraction of the MEAN MATRIX from the SINGLE HOME MATRIX to obtain element-wise differences; and/or
element-wise division of the element-wise differences by the STANDARD DEVIATION MATRIX to obtain element-wise results that are assigned to the NORMALIZED MATRIX.

6. The computer-implemented method of claim 1, wherein the interval data is hourly interval data.

7. The computer-implemented method of claim 1, wherein the period selected to be tested is a 24-hour period.

8. The computer-implemented method of claim 1, wherein the method is performed for each of a plurality of single whole house meter locations in the superset to be tested.

9. The computer-implemented method of claim 1, wherein the detection algorithm is selected from the group consisting of the Likelihood Ratio Test and Support Vector Machine classification.

10. The computer-implemented method of claim 1, further comprising the steps of:
for a whole house meter location for which a determination is made that PEV charging is present, assigning a reduced billing rate for at least some electrical power consumption at that whole house meter location; and/or
performing a distribution infrastructure load assessment based at least in part on the detection of PEV charging at whole house meter locations according to the method.

11. The computer-implemented method of claim 10, wherein the method comprises the step of:
for a whole house meter location for which a determination is made that PEV charging is present, assigning a reduced billing rate for at least some electrical power consumption at that whole house meter location, and the reduced billing rate is assigned only for a period in which PEV charging is detected according to the method.

12. A computer-implemented method for detecting plugin electrical vehicle (PEV) charging at a whole house electrical meter location using a Support Vector Machine (SVM) algorithm, comprising the steps of:
providing a plurality of whole house electrical meters, wherein each whole house electrical meter is located at a particular whole house electrical meter location, and provides input data regarding that particular whole house electrical meter location;
retrieving the input data from a tangible computer memory, said input data including (i) whole house meter interval data for a single whole house meter location to be tested and (ii) whole house meter interval data for a superset of whole house meter locations;
calculating time-referenced summary statistics comprising the means for the whole house meter interval data for the superset;
selecting a time period for testing a location for PEV charging; generating a SINGLE HOME MATRIX which is a matrix of whole house meter interval data to be tested (x);
generating a TEMPORAL SEGMENTATION MATRIX which is a matrix of corresponding interval means from the superset (n);
selecting a NOMINAL DAY MODEL MATRIX of whole house meter interval data from a set of parameterized matrices with no PEV charging based on what matrix has the smallest norm (i.e. Euclidean/L2 norm) of difference with respect to the TEMPORAL SEGMENTATION MATRIX (so NOMINAL DAY MODEL MATRIX* H=TEMPORAL SEGMENTATION MATRIX, but for an infinite set of matrices, NOMINAL DAY MODEL MATRIX=\i=TEMPORAL SEGMENTATION MATRIX);
generating a PEV DAY MODEL MATRIX of whole house meter interval data that is the element-wise sum of the NOMINAL DAY MODEL MATRIX plus a predetermined sequence of PEV charging load that is typical for the time period selected (n+Xi); calculating the norm for the difference of SINGLE HOME MATRIX minus NOMINAL DAY MODELMATRIX (i.e. Euclidian/L2 norm) and then taking the reciprocal, assigned to NULL $(=1/\|x-\backslash i\|)$;
calculating the norm for the difference of SINGLE HOME MATRIX minus PEV DAY MODELMATRIX (i.e. Euclidian/L2 norm) and then taking the reciprocal, assigned to ALTERNATE $(=1/1|x-(n+Xi)\|=1/\|x-n-Xi\|)$; dividing ALTERNATE by NULL to obtain a RATIO value; making the determination that if the RATIO value is greater than a preselected calibration parameter, then a PEV is detected, else no PEV is detected for the selected single whole house meter location during the time period being tested; and storing a record of the determination in tangible computer memory.

13. The computer-implemented method of claim 12, wherein the superset of whole house meter locations is selected from the group consisting of the whole population of whole house meter locations.

14. The computer-implemented method of claim 12, wherein the superset of whole house meter locations is a subgroup of the whole population of whole house meter locations.

15. The computer-implemented method of claim 14, wherein the subgroup is a subgroup of the whole population of whole house meter locations based on one or more of geographical location, type of home and demographics.

16. The computer-implemented method of claim 12, wherein the interval data is hourly interval data.

17. The computer-implemented method of claim 12, wherein the period selected to be tested is a 24-hour period.

18. The computer-implemented method of claim 12, wherein the method is performed for each of a plurality of single whole house meter locations in the superset to be tested.

19. The computer-implemented method of claim 12, further comprising the step of:
- for a whole house meter location for which a determination is made that PEV charging is present, assigning a reduced billing rate for at least some electrical power consumption at that whole house meter location; and/or
- performing a distribution infrastructure load assessment based at least in part on the detection of PEV charging at whole house meter locations according to the method.

20. The computer-implemented method of claim 19, wherein the method comprises the step of: for a whole house meter location for which a determination is made that PEV charging is present, assigning a reduced billing rate for at least some electrical power consumption at that whole house meter location, and
- the reduced billing rate is assigned only for a period in which PEV charging is detected according to the method.

21. A computer-implemented method for detecting plugin electrical vehicle (PEV) charging at a whole house electrical meter location using a Likelihood Ration Test (LRT) algorithm, comprising the steps of:
- providing a plurality of whole house electrical meters, wherein each whole house electrical meter is located at a particular whole house electrical meter location, and provides input data regarding that particular whole house electrical meter location;
- retrieving the input data from a tangible computer memory, said input data including (i) whole house meter interval data for a single whole house meter location to be tested and (ii) whole house meter interval data for a superset of whole house meter locations;
- calculating time-referenced summary statistics comprising the means and standard deviations for the whole house meter interval data for the superset; selecting a time period for testing a location for PEV charging; generating a SINGLE HOME MATRIX which is a matrix of whole house meter interval data to be tested (x);
- generating one or both of:
- a MEAN MATRIX which is a matrix of corresponding interval means from the superset (\i), and
- a STANDARD DEVIATION MATRIX which is a matrix of corresponding interval standard deviations from the superset (a);
- generating a TEMPORAL SEGMENTATION MATRIX which is a concatenated matrix of MEAN MATRIX and STANDARD DEVIATION MATRIX [\i, a];
- selecting a joint probability density/mass function from a set of parameterized functions for no PEV charging (null function) based on which function's corresponding matrix of concatenated means and standard deviations has the smallest norm (i.e. Euclidean/L2 norm) of difference with respect TEMPORAL SEGMENTATION MATRIX;
- generating a joint probability density/mass function for a PEV charging (alternate function) by adding a mean and standard deviation adjustment to the null function which could be as simple as a constant mean offset by charge rate R or a time-weighted offset for mean and standard deviation;
- calculating the alternate function value for the SINGLE HOME MATRIX and assign to ALTERNATE HYPOTHESIS;
- dividing the ALTERNATE HYPOTHESIS by the NULL HYPOTHESIS to obtain a RATIO value; and
- making the determination that if the RATIO value is greater than a preselected calibration parameter, then a PEV is detected, else no PEV is detected for the selected whole house meter location during the time period being tested; and
- storing a record of the determination in tangible computer memory.

22. The computer-implemented method of claim 21, wherein the alternate function is Alternate Hypothesis: $\Theta_{1,k}(R)=[\mu_k+R,\sigma_k,A_k]$.

23. The computer-implemented method of claim 21, wherein the alternate function is $$f_{daily}(x \mid \Theta_1(R)) \approx \sum_{(e)} \sum_{(s)} f_{daily}(x \mid \Theta_1(R), s, e) f_{s,R}(s) f_{e,R}(e).$$

24. The computer-implemented method of claim 21, wherein the superset of whole house meter locations is selected from the group consisting of the whole population of whole house meter locations.

25. The computer-implemented method of claim 21, wherein the superset of whole house meter locations is a subgroup of the whole population of whole house meter locations.

26. The computer-implemented method of claim 25, wherein the subgroup is a subgroup of the whole population of whole house meter locations based on one or more of geographical location, type of home and demographics.

27. The computer-implemented method of claim 21, wherein the interval data is hourly interval data.

28. The computer-implemented method of claim 21, wherein the period selected to be tested is a 24-hour period.

29. The computer-implemented method of claim 21, wherein the method is performed for each of a plurality of single whole house meter locations in the superset to be tested.

30. The computer-implemented method of claim 21, further comprising the step of:
- for a whole house meter location for which a determination is made that PEV charging is present, assigning a reduced billing rate for at least some electrical power consumption at that whole house meter location; and/or
- performing a distribution infrastructure load assessment based at least in part on the detection of PEV charging at whole house meter locations according to the method.

31. The computer-implemented method of claim 21, wherein the method comprises the step of:
- for a whole house meter location for which a determination is made that PEV charging is present, assigning a reduced billing rate for at least some electrical power consumption at that whole house meter location, and
- the reduced billing rate is assigned only for a period in which PEV charging is detected according to the method.

* * * * *